(12) United States Patent
Noda et al.

(10) Patent No.: US 7,576,028 B2
(45) Date of Patent: Aug. 18, 2009

(54) CATALYST BODY

(75) Inventors: Naomi Noda, Ichinomiya (JP); Junichi Suzuki, Kuwana (JP); Takashi Harada, Nagoya (JP)

(73) Assignee: NGK Insulators, Ltd., Nagoya-shi (JP)

( * ) Notice: Subject to any disclaimer, the term of this patent is extended or adjusted under 35 U.S.C. 154(b) by 533 days.

(21) Appl. No.: 09/735,930

(22) Filed: Dec. 14, 2000

(65) Prior Publication Data

US 2001/0044376 A1    Nov. 22, 2001

(30) Foreign Application Priority Data

Dec. 17, 1999   (JP) .................. 11-359576
May 9, 2000     (JP) .................. 2000-136287

(51) Int. Cl.
*B01J 23/40*    (2006.01)

(52) U.S. Cl. .............. 502/202; 502/203; 502/204; 502/206; 502/207; 502/208; 502/209; 502/210; 502/211; 502/212; 502/213; 502/215; 502/216; 502/217; 502/218; 502/219; 502/220; 502/221; 502/223; 502/224; 502/227; 502/228; 502/230; 502/241; 502/242; 502/243; 502/247; 502/248; 502/254; 502/255; 502/257; 502/261; 502/262; 502/309; 502/310; 502/312; 502/313; 502/330

(58) Field of Classification Search .......... 502/306, 502/327, 328, 330, 332, 333, 334, 339, 340, 502/341, 344, 355, 415, 439, 527.12, 527.19, 502/202–204, 206–213, 215–221, 223–224, 502/227–228, 230, 241–243, 247–248, 254–255, 502/257, 261–262, 309–310, 312–313

See application file for complete search history.

(56) References Cited

U.S. PATENT DOCUMENTS

| | | | |
|---|---|---|---|
| 4,207,169 A | 6/1980 | Courty et al. ............. 208/124 |
| 5,260,249 A | 11/1993 | Shiraishi et al. ........... 502/304 |
| 5,874,057 A | 2/1999 | Deeba et al. .............. 423/239 |
| 5,911,960 A | 6/1999 | Miyoshi et al. | |
| 5,922,295 A * | 7/1999 | Chattha et al. ........... 423/213.7 |
| 5,968,870 A * | 10/1999 | Iizuka et al. .............. 502/325 |
| 5,972,828 A | 10/1999 | Doi et al. | |
| 6,159,897 A * | 12/2000 | Suzuki et al. ............. 502/351 |
| 6,165,429 A * | 12/2000 | Ikeda et al. ............... 423/213.5 |
| 6,174,835 B1 * | 1/2001 | Naito et al. ............... 502/325 |
| 6,180,558 B1 | 1/2001 | Kurokawa et al. ......... 502/304 |
| 6,214,307 B1 * | 4/2001 | Okumura et al. .......... 423/213.5 |
| 6,228,800 B1 * | 5/2001 | Yamaguchi et al. ........ 502/339 |
| 6,251,820 B1 * | 6/2001 | Tsuji ...................... 502/242 |
| 6,294,140 B1 * | 9/2001 | Mussmann et al. ........ 423/213.5 |
| 6,303,536 B1 * | 10/2001 | Chen et al. ............... 502/325 |
| 6,348,430 B1 * | 2/2002 | Lindner et al. ............ 502/304 |
| 6,350,421 B1 | 2/2002 | Strehlau et al. .......... 423/231.2 |
| 6,372,688 B1 * | 4/2002 | Yamashita et al. ......... 502/326 |
| 6,375,910 B1 * | 4/2002 | Deeba et al. ............. 423/239.1 |
| 6,376,423 B2 * | 4/2002 | Yagi et al. ............... 502/326 |
| 2003/0144132 A1 | 7/2003 | Tanada et al. | |

FOREIGN PATENT DOCUMENTS

| | | |
|---|---|---|
| DE | 197 13 432 A1 | 10/1997 |
| EP | 0 387 611 A1 | 9/1990 |
| EP | 0 485 180 A1 | 5/1992 |
| EP | 0 657 204 A1 | 12/1994 |
| EP | 0 786 285 | 7/1997 |
| EP | 0 787 522 A2 | 8/1997 |
| EP | 0 9823 066 A1 | 3/2000 |
| JP | 07-051544 | 2/1995 |
| JP | 09-085092 | 3/1997 |
| JP | 9-192487 | 7/1997 |
| JP | 9 192487 | 7/1997 |
| JP | 09-201531 | 8/1997 |
| JP | 10-109032 | 4/1998 |
| JP | 10-225642 | 8/1998 |
| JP | 2000-084405 | 3/2000 |
| JP | 2000-279810 | 10/2000 |
| JP | 2001-129402 | 5/2001 |

* cited by examiner

*Primary Examiner*—Stuart Hendrickson
(74) *Attorney, Agent, or Firm*—Burr & Brown

(57) ABSTRACT

A catalyst body comprising a carrier and a catalyst layer containing an alkali metal and/or an alkaline earth metal, loaded on the carrier, which catalyst further contains a substance capable of reacting with the alkali metal and/or the alkaline earth metal, dominating over the reaction between the main components of the carrier and the alkali metal and/or the alkaline earth metal. With this catalyst body, the deterioration of the carrier by the alkali metal and/or the alkaline earth metal is prevented; therefore, the catalyst body can be used over a long period of time.

9 Claims, No Drawings

CATALYST BODY

BACKGROUND OF THE INVENTION (1) Field of the Invention

The present invention relates to a catalyst body containing in a carrier an alkali metal and/or alkaline earth metal, particularly Li, Na, K or Ca, which is used, for example, as an NOx adsorption catalyst for purification of automobile exhaust gas.

(2) Description of Related Art

In recent years, as the regulation for automobile exhaust gas has become severer, lean burn engines and direct injection engines have come to be used widely. Thus, in accordance with this change, NOx adsorption catalysts capable of effectively purifying the NOx present in an automobile exhaust gas under lean burn conditions have been put into practical use. As the NOx adsorption components used in the NOx adsorption catalysts, there are known alkali metals such as K, Na, Li, Cs and the like; alkaline earth metals such as Ba, Ca and the like; rare earth elements such as La, Y and the like; and so forth. Ba, in particular, has been widely used from the start of practical application of the NOx adsorption catalysts. Lately, addition of K superior in NOx adsorption ability at high temperatures has come to be tried.

An NOx adsorption catalyst is ordinarily constituted by (a) a carrier made of an oxide type ceramic material such as cordierite, or a metal material such as Fe—Cr—Al alloy and (b) a catalyst layer containing the above-mentioned NOx adsorption component, loaded on the carrier (a). The carrier, however, is easily corroded and deteriorated by alkali metals or some alkaline earth metals being activated under high temperature conditions derived from automobile exhaust gas, especially, Li, Na, K and Ca. In particular, there is a serious problem that a cordierite carrier made of an oxide type ceramic material generates cracks, since the carrier easily reacts with the above-mentioned alkali and alkaline earth metals, etc.

OBJECT AND SUMMARY OF THE INVENTION

In view of the above-mentioned conventional situations, the present invention has been made, aiming at providing a catalyst body usable, for example, as an NOx adsorption catalyst comprising a carrier and a catalyst layer containing an alkali metal and/or an alkaline earth metal, loaded on the carrier; of which carrier being prevented from the deterioration caused by the alkali metal and/or the alkaline earth metal and said body having a long period of duration.

According to the present invention, there is provided a catalyst body comprising a carrier and a catalyst layer containing an alkali metal and/or an alkaline earth metal, loaded on the carrier, which catalyst body further contains in a carrier a substance capable of reacting with the alkali metal and/or the alkaline earth metal, dominating over the reaction between the main components of the carrier and the alkali metal and/or the alkaline earth metal.

Incidentally, the "reaction" referred to in the present specification means not only a pure "chemical reaction" but also a phenomenon in which one substance as its function gives any influence on other substance or these two substances interact therebetween.

DETAILED DESCRIPTION OF THE INVENTION

The catalyst body of the present invention comprises a carrier and a catalyst layer containing an alkali metal and/or an alkaline earth metal, loaded on the carrier, which catalyst further contains a substance capable of reacting with the alkali metal and/or the alkaline earth metal, dominating over the reaction between the main components of the carrier and the alkali metal and/or the alkaline earth metal, and this substance is hereinafter referred to as "anchor substance". With this catalyst body, even when the catalyst body is exposed to a high temperature during the use, the alkali metal and/or the alkaline earth metal in the catalyst layer reacts predominantly with the anchor substance; thereby its reaction with the carrier is suppressed; and resultantly, the deterioration of the carrier is suppressed.

Of the alkali metals and/or alkaline earth metals used as the catalyst component, Li, Na, K and Ca deteriorate the carrier seriously. Therefore, when such a catalyst component is used, it is preferred to use, as an anchor substance, a substance reactive predominantly with the catalyst component. The kind of the anchor substance used differs depending upon the material of the carrier used; however, specific examples of the anchor substance are B, Al, Si, P, S, Cl, Ti, V, Cr, Mn, Ga, Ge, As, Se, Br, Zr, Mo, Sn, Sb, I and W.

Of these anchor substances, preferred from the standpoints of non-catalyst poisoning and wide use are B, Al, Si, P, S, Ti, Cr, Mn, Br, Zr, Mo, Sn, I and W; and preferred from the standpoint of reactivity with K are Si, P, Ti, Cr, Mo and W. Si and P are most preferred from the standpoint of retention of carrier strength. P is reactive with K but deactivates noble metal components; therefore, when the catalyst layer contains a noble metal component, it is preferred that poisoning of the noble metal component by P is alleviated by appropriately selecting the form of P disposition (described later), etc. Ti, Cr, Mo and W are seldom used in purification of automobile exhaust gas, but are generally used as catalyst components and give little adverse effects on the catalytic activities of alkali metals or alkaline earth metals; therefore, they are more suitable anchor substances. These anchor substances can be used singly or in combination of a plurality of kinds.

There is no particular restriction as to the form in which the anchor substance is added. Some anchor substances can be used as a simple substance, but a compound between anchor substance and other element is used usually. Specifically, an oxide or the like is appropriately used when the anchor substance is added as a solid (a powder); a nitrate, a sulfate, a hydroxide, a chloride, an ammonium salt, an organic acid salt or the like is appropriately used when the anchor substance is added as a liquid (a solution). Of these compounds, preferred are such compounds as when subjected to a treatment such as firing or the like, only the anchor substance and oxygen are left in the catalyst body after the treatment. For example, $H_3PO_4$ when the anchor substance is P and a silica sol when the anchor substance is Si are inexpensive and preferred for industrial use. A compound between two or more kinds of anchor substances, such as $TiSi_2$ or the like is also preferred.

The disposition of anchor substance in catalyst can be made in the following forms according to the following methods.

[Disposition of Anchor Substance in Carrier]

This form of disposition is preferred when the carrier is porous. This form of disposition is specifically carried out by immersing a carrier in a solution of relatively low viscosity containing at least one kind of anchor substances to infiltrate the solution into the carrier to dispose the anchor substance in the carrier. Alternatively, an anchor substance may be added to a carrier at a stage of producing the carrier. In the latter case, the anchor substance may be added as a solution, or as a solid (a powder) of an oxide or the like.

[Disposition of Anchor Substance in Catalyst Layer]

This form of disposition may be carried out by various methods, regardless of whether the carrier is porous or not. Some of the methods are mentioned below. However, the methods usable are not restricted thereto.

(1) Method of loading a catalyst layer on a carrier and then impregnating the catalyst layer-loaded carrier with a solution containing at least one kind of anchor substances This method has a demerit in that the anchor substance diffuses into the catalyst layer from its surface and, as a result, the anchor substance tends to be present mostly in the vicinity of the surface of the catalyst layer; meanwhile, the method has a merit in that the process of the method is simple. The anchor substance may reach as far as the interior of the catalyst layer, depending upon the thickness and density of the catalyst layer.

(2) Method of predoping at least one kind of catalyst layer components with at least one kind of anchor substances and then coating the predoped catalyst layer component on a carrier.

In this method, predoping may be conducted with the anchor substance alone or together with other catalyst layer components. Hence, this method can be classified into the following methods (a) to (e).

(a) Method of predoping a heat-resistant inorganic oxide represented by $\gamma\text{-}Al_2O_3$) with an NOx adsorption component, an anchor substance and a noble metal simultaneously, using a solution containing the three predopants Ordinarily, in NOx adsorption catalysts, a catalyst component is loaded on a carrier in a highly dispersed state; therefore, a heat-resistant inorganic oxide having a large specific surface area, such as $\gamma\text{-}Al_2O_3$ or the like is used as a loading component of the catalyst layer. As a catalyst component of the catalyst layer, there is used an NOx adsorption component such as alkali metal or alkaline earth metal. As other catalyst components of the catalyst layer, there is used a noble metal such as Pt, Pd or Rh so that, prior to the NOx adsorption by the above NOx adsorption component, the NO and $O_2$ in exhaust gas can be reacted with each other to generate $NO_2$, or the NOx once occluded and then released can be reacted with the combustible components in exhaust gas and made non-harmful. In this method, a heat-resistant inorganic oxide is mixed into a solution containing an alkali metal and/or an alkaline earth metal as an NOx adsorption component, the above-mentioned noble metal and an anchor substance; the resulting mixture is subjected to firing or the like; thereby, the NOx adsorption component, the anchor substance and the noble metal are fixed on the heat-resistant inorganic oxide.

(b) Method of predoping a heat-resistant inorganic oxide represented by $\gamma\text{-}Al_2O_3$) with an NOx adsorption component, an anchor substance and a noble metal in order, using respective solutions There is no particular restriction as to the order of predoping. With respect to the noble metal, for example, when it is used as a first predopant, the high specific surface area of the heat-resistant inorganic oxide can be utilized most effectively and, as a result, the noble metal can be dispersed in a high concentration. Meanwhile, in a case where the noble metal is used as a last predopant, the noble metal can be fixed on the outermost surface of the heat-resistant inorganic oxide having the highest contact efficiency, and the NOx can contact with the noble metal earliest and efficiently when NOx enters into the thus-produced catalyst body. In any predoping order, it is preferable to conduct firing or the like after each predoping, for fixation of predopant(s) because a fear of redissolution in the next predoping step is made small thereby. When the NOx adsorption component, the anchor substance and the noble metal are each used by a plurality of kinds, the plurality of kinds can be used in one predoping step or in sequential predoping steps.

(c) Method which is intermediate between (a) and (b), i.e. method of combining any two of an NOx adsorption component, an anchor substance and a noble metal (naturally, the combined two materials are used simultaneously) and conducting predoping in any order or in a predetermined order.

(d) Method of independently preparing a heat-resistant inorganic oxide predoped with an NOx adsorption component, a heat-resistant inorganic oxide predoped with an anchor substance and a heat-resistant inorganic oxide predoped with a noble metal, and coating them on a carrier as a mixture or in respective layers.

(e) Method which is intermediate between (a) and (d), i.e. method of combining any two of an NOx adsorption component, an anchor substance and a noble metal (naturally, the combined two materials are used simultaneously) and conducting predoping for a single heat-resistant inorganic oxide or for different heat-resistant inorganic oxides When the NOx adsorption component, the anchor substance and the noble metal are each used by a plurality of kinds, predoping using all the kinds can be conducted in one step or predoping using each kind can be conducted for each independent heat-resistant inorganic oxide. This method can appropriately be combined with the method (c).

In any of the above methods (a) to (e), the heat-resistant inorganic oxide to be predoped is not restricted to $Al_2O_3$ and can also be, for example, $CeO_2$, $ZrO_2$, $La_2O_3$ which are widely used in catalysts for purification of automobile exhaust gas, compound oxides between them and compound oxides between them and $Al_2O_3$. When the NOx adsorption component or the anchor substance is added into a slurry, in the form of a powder of an oxide or other compounds, it is possible, for example, to predope an NOx adsorption component oxide with an anchor substance- or noble metal-containing solution and thus conduct predoping between the NOx adsorption component, the anchor substance and the noble metal without using any heat-resistant inorganic oxide.

(3) Method of mixing a material containing at least one kind of anchor substances, directly into a slurry of an NOx adsorption components and coating the resulting mixture on a carrier The material containing the anchor substance may be a solid or liquid (e.g. solution) of an oxide or other compound of anchor substance.

[Disposition of Anchor Substance-containing Layer Between Carrier and Catalyst Layer]

As in the case of disposing an anchor substance in a catalyst layer, whether the carrier used is porous or not, is not critical. However, when the carrier is extremely porous, it is difficult to form, in a small thickness, an anchor substance-containing layer (an intermediate layer) between the carrier and a catalyst layer. In a specific method of forming the intermediate layer, an anchor substance-containing solution of relatively high viscosity is prepared using a sol or the like, and a carrier is immersed in the solution. Also, by applying the above-mentioned form of disposing an anchor substance in a catalyst layer, there is formed an intermediate layer containing a heat-resistant inorganic oxide or the like and an anchor substance. An intermediate layer is also formed preferably by preparing a slurry of an oxide or the like of an anchor substance and loading the slurry on a carrier. Using a sol of an anchor substance in the above slurry preparation is highly preferable because it can easily form a homogenous intermediate layer. Formation of the intermediate layer is not restricted to these methods. In any method, it is preferred to (a) conduct drying and/or firing when an intermediate layer has been formed, to fix the intermediate layer and then (b) form thereon an NOx adsorption catalyst layer.

In any of the above disposition forms, it is preferred to conduct drying and/or firing for fixation each time when impregnation, predoping, coating or the like has been completed. When the fixation of the catalytic layer is made by firing, the firing temperature is preferably 500 to 800° C. Allowing one or different kinds of anchor substances to be present in a catalyst by using a plurality of disposition forms, is preferred because a higher suppressability of carrier deterioration is obtained. For example, disposition of Ti in a catalyst layer, and/or formation of a Si-containing zeolite intermediate layer, and disposition of Si and/or P in a carrier is a preferred combination of disposition forms.

In the catalyst body of the present invention, the shape of the carrier is not critical. When there is used a carrier having any shape of monolith honeycomb, pellets, beads, ring, etc., the above-mentioned suppressability of carrier deterioration is attained. The suppressability is largest when there is used a honeycomb carrier constituted by a large number of passages (cells) surrounded by thin partition walls.

As the material for honeycomb carrier, there are preferably used, for example, ceramics such as cordierite, mullite, alumina and the like; metallic foils made of a heat-resistant stainless steel such as Fe—Cr—Al alloy or the like; and honeycomb structures shaped by powder metallurgy. When there is used a carrier made of cordierite highly reactive with Li, Na, K and Ca, the suppressability of carrier deterioration is largest.

The shape of the passages (cells) of honeycomb carrier can be any of circular, polygonal, corrugated, etc. The external shape of honeycomb carrier can be one compatible with the internal shape of an exhaust gas system in which the honeycomb carrier is accommodated.

The cell density of honeycomb carrier is not critical, either; however, it is preferably 6 to 1,500 cells/in.$^2$ (0.9 to 233 cells/cm$^2$). The thickness of the partition walls of honeycomb carrier is preferably 20 to 2,000 μm. When the partition walls have a small thickness of 20 to 200 μm, the diffusion of alkali metal and/or alkaline earth metal from the catalyst layer to the center of the wall thickness of carrier is easy and the deterioration of the carrier is serious; therefore, in the case of such a small thickness of partition walls, the catalyst body of the present invention is particularly effective and shows a high effect for suppression of carrier deterioration.

The amount of the anchor substance used in the catalyst is preferably 0.05 to 10 equivalents, more preferably 0.1 to 5 equivalents relative to the alkali metal and/or alkaline earth metal (e.g. Li, K, Na or Ca) which coexists with the anchor substance and reacts therewith to form a compound. The amount of the alkali metal and/or alkaline earth metal coexisting with the anchor substance should be appropriately determined based on the unit volume of catalyst. When the amount of the anchor substance is less than 0.05 equivalent, there is no effect for suppression of carrier deterioration; when the amount is more than 10 equivalents, the effect is flat and shows no further increase. When the amount is less than 0.1 equivalent, the effect for suppression of carrier deterioration is small; when the amount is more than 5 equivalents, the cost incurred is high for the effect obtained. The absolute amount of the anchor substance is preferably 0.5 to 100 g (in terms of anchor substance element) per liter of catalyst unit volume. When the absolute amount of the anchor substance is less than 0.5 g per liter, only a small effect for suppression of carrier deterioration is obtained. When the anchor substance is loaded in an amount exceeding 100 g per liter on one carrier together with an NOx adsorption catalyst layer and when the carrier is a honeycomb carrier, there is a fear of cell plugging. From the overall standpoint of the effect for suppression of carrier deterioration, the incurred cost, the loadability, etc., the amount of the anchor substance is preferably 2 to 60 g, more preferably 10 to 50 g per liter of catalyst unit volume.

The catalyst body of the present invention can be used simultaneously with other purifiers used in an exhaust gas system, such as NOx adsorption catalyst made of a different component, other catalyst typified by a three-way catalyst, co-catalyst, HC adsorbent and the like. In that case, the other purifiers may be mixed with the catalyst layer of the present catalyst or may be superimposed on the present catalyst in layers. Or, the present catalyst may be used in appropriate combination with these other purifiers in an exhaust gas system.

EXAMPLES

The present invention is described in more detail below by way of Examples. However, the present invention is in no way restricted to these Examples.

[Production of Slurries for Wash-coating of NOx Adsorption Catalyst]

(K Catalyst Slurry)

A commercially available γ-$Al_2O_3$ powder having a specific surface area of 200 m$^2$/g was immersed in a solution obtained by mixing an aqueous $(NH_3)Pt(NO_2)_2$ solution and an aqueous $KNO_3$ solution. The resulting material was stirred for 2 hours in a pot mill. The material after stirring was subjected to vaporization to dryness to remove the water. The resulting solid was subjected to dry disintegration, followed by firing in an electric furnace at 600° C. for 3 hours, to obtain a (Pt+K)-predoped γ-$Al_2O_3$ powder. To the powder were added an $Al_2O_3$ sol and water. The resulting mixture was subjected to wet grinding in a pot mill to prepare a slurry for wash-coating. The relative quantities of γ-$Al_2O_3$ Pt and K were adjusted at the above mixing and immersion stage so that when the above slurry was wash-coated on a honeycomb carrier and the slurry-coated honeycomb carrier was fired and, in the resulting catalyst, the amount of K catalyst loaded was 100 g per liter of honeycomb, the amount of Pt element became 30 g per cft of honeycomb (1.06 g per liter) and the amount of K element became 20 g per liter of honeycomb. The $Al_2O_3$ sol was added in such an amount that its solid content expressed as $Al_2O_3$ became 5% by weight of the total $Al_2O_3$; and the water was added so that the resulting slurry had an appropriate viscosity allowing easy wash-coating.

(Na Catalyst Slurry)

An Na catalyst slurry was prepared in the same manner as for the K catalyst slurry except that an aqueous $NaNO_3$ solution was used in place of the aqueous $KNO_3$ solution and the amount of Na was set at 11.8 g per liter.

(Li Catalyst Slurry)

A Li catalyst slurry was prepared in the same manner as for the K catalyst slurry except that an aqueous $LiNO_3$ solution was used in place of the aqueous $KNO_3$ solution and the amount of Li was set at 3.6 g per liter.

[Production of NOx Adsorption Catalysts]

Example 1

First, a cordierite honeycomb carrier [partition wall thickness=6 mil (0.15 mm), cell density=400 cpsi (62 cells/cm$^2$), porosity=30%] was immersed in an aqueous $H_3PO_4$ solution.

Since the carrier was porous, the aqueous $H_3PO_4$ solution infiltrated into the interior of each cell wall. The excessive solution in the cells was removed by blowing, after which the carrier was dried. The amount of $H_3PO_4$ loaded was adjusted so that the moles of P element per unit volume of honeycomb carrier became 0.67 time the moles of the K element contained in the K catalyst later wash-coated and loaded. When one time of immersion and drying failed to give a desired H3PO4 amount, the step of immersion and drying was repeated until the amount was reached. The honeycomb after drying was fired in an electric furnace at 700° C. for 1 hour. On this honeycomb after firing was wash-coated the above-mentioned K catalyst slurry (hereinafter, "the above-mentioned K catalyst slurry" refers to the initial slurry before adjustment of the relative quantities of $\gamma$-$Al_2O_3$, Pt and K, mentioned in the above production of K catalyst slurry, and the coated honeycomb was dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 1 was obtained.

Example 2

An NOx adsorption catalyst 2 was obtained in the same manner as in Example 1 except that (1) an aqueous $(NH_4)_2[TiO(C_2O_4)_2]$ solution was used in place of the aqueous $H_3PO_4$ solution, (2) the amount of $(NH_4)_2[TiO(C_2O_4)_2]$ loaded was adjusted so that the moles of Ti element per unit volume of honeycomb carrier became 0.1 time the moles of the K element contained in the K catalyst later wash-coated and loaded, and (3) the cordierite honeycomb carrier was immersed in the aqueous $(NH_4)_2[TiO(C_2O_4)_2]$ solution and dried, and the dried honeycomb was fired at 700° C. for 1 hour.

Example 3

A slurry obtained by mixing a $TiO_2$ sol and a $TiO_2$ powder was wash-coated on the same cordierite honeycomb carrier as used in Example 1, and the coated cordierite honeycomb carrier was dried. The amount of $TiO_2$ loaded was adjusted so that the moles of total Ti element (from the $TiO_2$ sol and the $TiO_2$ powder) per unit volume of honeycomb carrier became equal to the moles of the K element contained in the K catalyst later wash-coated and loaded. When one time of wash-coating and drying failed to give a desired $TiO_2$ amount, the step of wash-coating and drying was repeated until the amount was reached. The honeycomb after drying was fired in an electric furnace at 700° C. for 1 hour to form a $TiO_2$ intermediate layer. On this honeycomb after firing was wash-coated the above-mentioned K catalyst slurry, and the resulting honeycomb was dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 3 was obtained.

Example 4

An NOx adsorption catalyst 4 was obtained in the same manner as in Example 3 except that the above-mentioned Na catalyst slurry was used in place of the K catalyst slurry.

Example 5

An NOx adsorption catalyst 5 was obtained in the same manner as in Example 3 except that the above-mentioned Li catalyst slurry was used in place of the K catalyst slurry.

Example 6

A K catalyst slurry was produced in the same manner as in the above-mentioned production of K catalyst slurry except that a $TiO_2$ sol was used in place of the $Al_2O_3$ sol. The amount of $TiO_2$ sol used was adjusted so that, in later wash-coating, the moles of Ti element per unit volume of honeycomb carrier became equal to the moles of K element. The slurry produced was wash-coated on the same cordierite honeycomb carrier as used in Example 1, and dried. This wash-coating and drying step was repeated if necessary until the amount of K catalyst loaded became 100 g per liter. Then, the resulting honeycomb was fired in an electric furnace at 600° C. for 1 hour to obtain an NOx adsorption catalyst 6.

Example 7

In mixing an aqueous $(NH_3)Pt(NO_2)_2$ solution and an aqueous $KNO_3$ solution in the above-mentioned production of K catalyst slurry, an aqueous $(NH_4)_2[TiO(C_2O_4)_2]$ solution was also mixed to obtain a K catalyst slurry containing a (Pt+K+Ti)-predoped $\gamma$-$Al_2O_3$ powder. In this case, the relative quantities of $\gamma$-$Al_2O_3$, Pt, K and Ti were adjusted at the above mixing and immersion stage so that when the above slurry was wash-coated on a honeycomb carrier and the slurry-coated honeycomb carrier was fired and, in the resulting catalyst, the amount of K catalyst loaded was 100 g per liter of honeycomb, the amount of Pt element became 30 g per cft of honeycomb (1.06 g per liter), the amount of K element became 20 g per liter of honeycomb, and the moles of Ti element became equal to the moles of K element. The slurry was wash-coated on the same cordierite honeycomb carrier as used in Example 1, and dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 7 was obtained.

Example 8

A $TiO_2$ powder was added to the K catalyst slurry obtained in the above-mentioned production of K catalyst slurry, in such an amount that the moles of Ti element per unit volume of honeycomb carrier became equal to the moles of K element. The $TiO_2$ powder-added slurry was wash-coated on the same cordierite honeycomb carrier as used in Example 1, and dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 8 was obtained.

Example 9

An NOx adsorption catalyst 9 was obtained in the same manner as in Example 8 except that the $TiO_2$ powder was added in such an amount that the moles of Ti element per unit volume of honeycomb carrier became 0.1 time the moles of K element.

Example 10

An NOx adsorption catalyst 10 was obtained in the same manner as in Example 2 except that (1) an aqueous $Cr(NO_3)_3$ solution was used in place of the aqueous $(NH_4)_2[TiO(C_2O_4)_2]$ solution and (2) the amount of $Cr(NO_3)_3$ loaded was adjusted so that the moles of Cr element per unit volume of honeycomb carrier became 0.1 time the moles of the K element contained in the K catalyst later wash-coated and loaded.

Example 11

An NOx adsorption catalyst 11 was obtained in the same manner as in Example 3 except that the cordierite honeycomb carrier was changed to a metal honeycomb carrier (made of a Fe—Cr—Al type metal foil, partition wall thickness=2 mil (0.05 mm), cell density=370 cpsi (57.5 cells/cm$^2$).

Example 12

An NOx adsorption catalyst 12 was obtained in the same manner as in Example 1 except that the amount of $H_3PO_4$ loaded was adjusted so that the moles of P element per unit volume of honeycomb carrier became 2.21 times the moles of the K element contained in the K catalyst later wash-coated and loaded.

Example 13

An NOx adsorption catalyst 13 was obtained in the same manner as in Example 1 except that the amount of $H_3PO_4$ loaded was adjusted so that the moles of P element per unit volume of honeycomb carrier became 1.52 times the moles of the K element contained in the K catalyst later wash-coated and loaded.

Example 14

An NOx adsorption catalyst 14 was obtained in the same manner as in Example 1 except that the amount of $H_3PO_4$ loaded was adjusted so that the moles of P element per unit volume of honeycomb carrier became 1.24 times the moles of the K element contained in the K catalyst later wash-coated and loaded.

Example 15

An NOx adsorption catalyst 15 was obtained in the same manner as in Example 1 except that the amount of $H_3PO_4$ loaded was adjusted so that the moles of P element per unit volume of honeycomb carrier became 0.14 time the moles of the K element contained in the K catalyst later wash-coated and loaded.

Example 16

An NOx adsorption catalyst 16 was obtained in the same manner as in Example 1 except that the amount of $H_3PO_4$ loaded was adjusted so that the moles of P element per unit volume of honeycomb carrier became 0.028 time the moles of the K element contained in the K catalyst later wash-coated and loaded.

Example 17

An NOx adsorption catalyst 17 was obtained in the same manner as in Example 1 except that (1) a silica sol was used in place of the aqueous $H_3PO_4$ solution and (2) the amount of silica sol loaded was adjusted so that the moles of Si element per unit volume of honeycomb carrier became 2.16 times the moles of the K element contained in the K catalyst later wash-coated and loaded.

Example 18

An NOx adsorption catalyst 18 was obtained in the same manner as in Example 17 except that the amount of silica sol loaded was adjusted so that the moles of Si element per unit volume of honeycomb carrier became 1.79 times the moles of the K element contained in the K catalyst later wash-coated and loaded.

Example 19

An NOx adsorption catalyst 19 was obtained in the same manner as in Example 17 except that the amount of silica sol loaded was adjusted so that the moles of Si element per unit volume of honeycomb carrier became 1.46 times the moles of the K element contained in the K catalyst later wash-coated and loaded.

Example 20

An NOx adsorption catalyst 20 was obtained in the same manner as in Example 17 except that the amount of silica sol loaded was adjusted so that the moles of Si element per unit volume of honeycomb carrier became 0.79 time the moles of the K element contained in the K catalyst later wash-coated and loaded.

Example 21

An NOx adsorption catalyst 21 was obtained in the same manner as in Example 17 except that the amount of silica sol loaded was adjusted so that the moles of Si element per unit volume of honeycomb carrier became 0.16 time the moles of the K element contained in the K catalyst later wash-coated and loaded.

Example 22

An NOx adsorption catalyst 22 was obtained in the same manner as in Example 17 except that the amount of silica sol loaded was adjusted so that the moles of Si element per unit volume of honeycomb carrier became 0.033 time the moles of the K element contained in the K catalyst later wash-coated and loaded.

Example 23

An NOx adsorption catalyst 23 was obtained in the same manner as in Example 2 except that the amount of $(NH_4)_2[TiO(C_2O_4)_2]$ loaded was adjusted so that the moles of Ti element per unit volume of honeycomb carrier became equal to the moles of the K element contained in the K catalyst later wash-coated and loaded.

Example 24

An NOx adsorption catalyst 24 was obtained in the same manner as in Example 10 except that the amount of $Cr(NO_3)_3$ loaded was adjusted so that the moles of Cr element per unit volume of honeycomb carrier became equal to the moles of the K element contained in the K catalyst later wash-coated and loaded.

Example 25

In mixing an aqueous $(NH_3)Pt(NO_2)_2$ solution and an aqueous $KNO_3$ solution in the above-mentioned production of K catalyst slurry, an aqueous $H_3PO_4$ solution was also mixed to obtain a K catalyst slurry containing a (Pt+K+P)-predoped γ-$Al_2O_3$ powder. In this case, the relative quantities of γ-$Al_2O_3$, Pt, K and P were adjusted at the above mixing and immersion stage so that when the above slurry was wash-coated on a honeycomb carrier and the slurry-coated honeycomb carrier was fired and, in the resulting catalyst, the amount of K catalyst loaded was 100 g per liter of honeycomb, the amount of Pt element became 30 g per cft of honeycomb (1.06 g per liter), the amount of K element became 20 g per liter of honeycomb, and the moles of P element became 1.24 times the moles of K element. The slurry was wash-coated on the same cordierite honeycomb carrier as used in Example 1, and dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 25 was obtained.

Example 26

A K catalyst slurry was produced in the same manner as in the above-mentioned production of K catalyst slurry except that a $SiO_2$ sol was used in place of the $Al_2O_3$ sol. The amount of $SiO_2$ sol used was adjusted so that, in later wash-coating and loading, the moles of Si element per unit volume of honeycomb carrier became 1.46 times the moles of K element. The slurry produced was wash-coated on the same cordierite honeycomb carrier as used in Example 1, and dried. This wash-coating and drying step was repeated if necessary until the amount of K catalyst loaded became 100 g per liter. Then, the resulting honeycomb was fired in an electric furnace at 600° C. for 1 hour to obtain an NOx adsorption catalyst 26.

Example 27

First, the same cordierite honeycomb carrier as used in Example 1 was immersed in an aqueous $H_3PO_4$ solution. Since the carrier was porous, the aqueous $H_3PO_4$ solution infiltrated into the interior of each cell wall. The excessive solution in the cells was removed by blowing, after which the carrier was dried. The amount of $H_3PO_4$ loaded was adjusted so that the moles of P element per unit volume of honeycomb carrier became 1.24 times the moles of the K element contained in the K catalyst later wash-coated and loaded. When one time of immersion and drying failed to give a desired $H_3PO_4$ amount, the step of immersion and drying was repeated until the amount was reached. The honeycomb after drying was fired in an electric furnace at 700° C. for 1 hour. On this honeycomb after firing was wash-coated the same slurry as obtained in Example 6, and the coated honeycomb was dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 27 was obtained.

Example 28

First, the same cordierite honeycomb carrier as used in Example 1 was immersed in an aqueous $H_3PO_4$ solution. Since the carrier was porous, the aqueous $H_3PO_4$ solution infiltrated into the interior of each cell wall. The excessive solution in the cells was removed by blowing, after which the carrier was dried. The amount of $H_3PO_4$ loaded was adjusted so that the moles of P element per unit volume of honeycomb carrier became 1.24 times the moles of the K element contained in the K catalyst later wash-coated and loaded. When one time of immersion and drying failed to give a desired $H_3PO_4$ amount, the step of immersion and drying was repeated until the amount was reached. The honeycomb after drying was fired in an electric furnace at 700° C. for 1 hour. On the honeycomb after firing was wash-coated a slurry obtained by mixing a zeolite and a silica sol, and the coated honeycomb was dried. The amount of $SiO_2$ loaded was adjusted so that the moles of Si element per unit volume of honeycomb carrier became 1.46 times the moles of the K element contained in the K catalyst later wash-coated and loaded. When one time of wash-coating and drying failed to give a desired $SiO_2$ amount, the step of wash-coating and drying was repeated until the amount was reached. The honeycomb after drying was fired in an electric furnace at 700° C. for 1 hour. On this honeycomb after firing was wash-coated the above-mentioned K catalyst slurry, and the coated honeycomb was dried. This wash-coating and drying step was repeated if necessary until the amount of K catalyst loaded became 100 g per liter. The resulting honeycomb was fired in an electric furnace at 600° C. for 1 hour, whereby an NOx adsorption catalyst 28 was obtained.

Example 29

An NOx adsorption catalyst 29 was obtained in the same manner as in Example 27 except that the amount of $H_3PO_4$ loaded was adjusted so that the moles of P element per unit volume of honeycomb carrier became 0.14 time the moles of the K element contained in the K catalyst later wash-coated and loaded.

Example 30

An NOx adsorption catalyst 30 was obtained in the same manner as in Example 28 except that the amount of $H_3PO_4$ loaded was adjusted so that the moles of P element per unit volume of honeycomb carrier became 0.14 time the moles of the K element contained in the K catalyst later wash-coated and loaded.

Example 31

An NOx adsorption catalyst 31 was obtained in the same manner as in Example 1 except that the amount of $H_3PO_4$ loaded was adjusted so that the moles of P element per unit volume of honeycomb carrier became 0.0028 time the moles of the K element contained in the K catalyst later wash-coated and loaded.

Example 32

An NOx adsorption catalyst 32 was obtained in the same manner as in Example 17 except that the amount of silica sol loaded was adjusted so that the moles of Si element per unit volume of honeycomb carrier became 0.0033 time the moles of the K element contained in the K catalyst later wash-coated and loaded.

Comparative Example 1

The above-mentioned K catalyst slurry was wash-coated on the same cordierite honeycomb carrier as used in Example 1, and the coated carrier was dried. This coating and drying step was repeated if necessary until the amount of K catalyst loaded became 100 g per liter. The resulting honeycomb was fired in an electric furnace at 600° C. for 1 hour to obtain an NOx adsorption catalyst 33.

Comparative Example 2

The above-mentioned Na catalyst slurry was wash-coated on the same cordierite honeycomb carrier as used in Example 1, and the coated carrier was dried. This coating and drying step was repeated if necessary until the amount of Na catalyst loaded became 100 g per liter. The resulting honeycomb was fired in an electric furnace at 600° C. for 1 hour to obtain an NOx adsorption catalyst 34.

Comparative Example 3

The above-mentioned Li catalyst slurry was wash-coated on the same cordierite honeycomb carrier as used in Example 1, and the coated carrier was dried. This coating and drying step was repeated if necessary until the amount of Li catalyst loaded became 100 g per liter. The resulting honeycomb was fired in an electric furnace at 600° C. for 1 hour to obtain an NOx adsorption catalyst 35.

Comparative Example 4

The above-mentioned K catalyst slurry was wash-coated on the same cordierite honeycomb carrier as used in Example 11, and the coated carrier was dried. This coating and drying step was repeated if necessary until the amount of K catalyst loaded became 100 g per liter. The resulting honeycomb was fired in an electric furnace at 600° C. for 1 hour to obtain an NOx adsorption catalyst 36.

[Accelerated Durability Test]

The NOx adsorption catalysts 1 to 36 obtained in Examples 1 to 32 and Comparative Examples 1 to 4 were placed in an electric furnace and subjected to an accelerated durability test under the conditions of a temperature of 850° C., a period of 30 hours and a moisture content of 10% in furnace. For reference, a cordierite honeycomb carrier per se was also subjected to the same accelerated durability test.

[Suppressability of Carrier Deterioration]

The NOx adsorption catalysts 1 to 36 after the above test were observed for microstructure using an electron microscope, to examine the extent of generation of cracks. Further, the catalysts using a cordierite honeycomb carrier were examined for flexural strengths before and after the test; and the catalysts using a metal honeycomb carrier were examined for tensile strengths of foil plate before and after the test. The results are shown in Tables 1 and 2.

TABLE 1

| | Kind of honeycomb carrier | Kind of NOx adsorption catalyst component | Kind of anchor substance | Site of anchor substance |
|---|---|---|---|---|
| NOx adsorption catalyst 1 | Cordierite | K | P | Mainly inside cell wall |
| NOx adsorption catalyst 2 | Cordierite | K | Ti | Mainly inside cell wall |
| NOx adsorption catalyst 3 | Cordierite | K | Ti | Mainly between cell wall and catalyst layer |
| NOx adsorption catalyst 4 | Cordierite | Na | Ti | Mainly between cell wall and catalyst layer |
| NOx adsorption catalyst 5 | Cordierite | Li | Ti | Mainly between cell wall and catalyst layer |
| NOx adsorption catalyst 12 | Cordierite | K | P | Mainly inside cell wall |
| NOx adsorption catalyst 13 | Cordierite | K | P | Mainly inside cell wall |
| NOx adsorption catalyst 14 | Cordierite | K | P | Mainly inside cell wall |
| NOx adsorption catalyst 15 | Cordierite | K | P | Mainly inside cell wall |
| NOx adsorption catalyst 16 | Cordierite | K | P | Mainly inside cell wall |
| NOx adsorption catalyst 17 | Cordierite | K | Si | Mainly inside cell wall |
| NOx adsorption catalyst 18 | Cordierite | K | Si | Mainly inside cell wall |
| NOx adsorption catalyst 19 | Cordierite | K | Si | Mainly inside cell wall |
| NOx adsorption catalyst 20 | Cordierite | K | Si | Mainly inside cell wall |

| | Amount of anchor substance added | | | |
|---|---|---|---|---|
| | Weight of oxide per honeycomb unit volume*1 | Molar ratio of anchor element to K, Na or Li | Generation of cracks | Decrease in strength*2 |
| NOx adsorption catalyst 1 | 24.1 g/l | 0.67 time | None | 16% |
| NOx adsorption catalyst 2 | 4.07 g/l | 0.1 time | A little | 37% |
| NOx adsorption catalyst 3 | 40.7 g/l | 1 time | Slight | 24% |
| NOx adsorption catalyst 4 | 40.7 g/l | 1 time | Slight | 30% |
| NOx adsorption catalyst 5 | 40.7 g/l | 1 time | Slight | 31% |
| NOx adsorption catalyst 6 | 40.7 g/l | 1 time | Slight | 32% |
| NOx adsorption catalyst 7 | 40.7 g/l | 1 time | Slight | 28% |
| NOx adsorption catalyst 8 | 40.7 g/l | 1 time | Slight | 30% |
| NOx adsorption catalyst 9 | 4.07 g/l | 0.1 time | A little | 35% |
| NOx adsorption catalyst 10 | 3.88 g/l | 0.1 time | A little | 38% |
| NOx adsorption catalyst 11 | 40.7 g/l | 1 time | Slight | 16% |
| NOx adsorption catalyst 12 | 80.0 g/l | 2.21 times | None | 11% |
| NOx adsorption catalyst 13 | 55.0 g/l | 1.52 times | None | 9% |
| NOx adsorption catalyst 14 | 45.0 g/l | 1.24 times | None | 8% |
| NOx adsorption catalyst 15 | 5.00 g/l | 0.14 time | None | 23% |
| NOx adsorption catalyst 16 | 1.00 g/l | 0.028 time | None | 40% |
| NOx adsorption catalyst 17 | 80.0 g/l | 2.61 times | None | 9% |
| NOx adsorption catalyst 18 | 55.0 g/l | 1.79 times | None | 10% |

TABLE 1-continued

| | | | | |
|---|---|---|---|---|
| NOx adsorption catalyst 19 | 45.0 g/l | 1.46 times | None | 11% |
| NOx adsorption catalyst 20 | 24.1 g/l | 0.79 time | None | 20% |

Notes for Table 1
*1: Calculated from the difference in weights after and before firing. Therefore, presumed to basically be the weight of oxide of anchor substance. Some anchor substances have a form of a plurality of oxides, but each anchor substance is presumed to be represented by $P_2O_5$, $SiO_2$, $TiO_2$ or $Cr_2O_3$.
*2: Decrease (%) in strength after durability test relative to initial strength

TABLE 2

| | Kind of honeycomb carrier | Kind of NOx adsorption catalyst component | Kind of anchor substance | Site of anchor substance |
|---|---|---|---|---|
| NOx adsorption catalyst 21 | Cordierite | K | Si | Mainly inside cell wall |
| NOx adsorption catalyst 22 | Cordierite | K | Si | Mainly inside cell wall |
| NOx adsorption catalyst 23 | Cordierite | K | Ti | Mainly inside cell wall |
| NOx adsorption catalyst 24 | Cordierite | K | Cr | Mainly inside cell wall |
| NOx adsorption catalyst 25 | Cordierite | K | P | Mainly in catalyst layer |
| NOx adsorption catalyst 26 | Cordierite | K | Si | Mainly in catalyst layer |
| NOx adsorption catalyst 27 | Cordierite | K | P | Mainly inside cell wall |
| | | | Ti | Mainly in catalyst layer |
| NOx adsorption catalyst 28 | Cordierite | K | P | Mainly inside cell wall |
| | | | Si | Mainly between cell wall and catalyst layer |
| NOx adsorption catalyst 29 | Cordierite | K | P | Mainly inside cell wall |
| | | | Ti | Mainly in catalyst layer |
| NOx adsorption catalyst 30 | Cordierite | K | P | Mainly inside cell wall |
| | | | Si | Mainly between cell wall and catalyst layer |
| NOx adsorption catalyst 31 | Cordierite | K | P | Mainly inside cell wall |
| NOx adsorption catalyst 32 | Cordierite | K | Si | Mainly inside cell wall |
| NOx adsorption catalyst 33 (comparison) | Cordierite | K | — | — |
| NOx adsorption catalyst 34 (comparison) | Cordierite | Na | — | — |
| NOx adsorption catalyst 35 (comparison) | Cordierite | Li | — | — |
| NOx adsorption catalyst 36 (comparison) | Metal | K | — | — |
| Carrier only (reference) | Cordierite | — | — | — |

| | Amount of anchor substance added | | | |
|---|---|---|---|---|
| | Weight of oxide per honeycomb unit volume*1 | Molar ratio of anchor element to K, Na or Li | Generation of cracks | Decrease in strength*2 |
| NOx adsorption catalyst 21 | 5.00 g/l | 0.16 time | Slight | 29% |
| NOx adsorption catalyst 22 | 1.00 g/l | 0.033 time | A little | 46% |
| NOx adsorption catalyst 23 | 40.7 g/l | 1 time | Slight | 20% |
| NOx adsorption catalyst 24 | 38.8 g/l | 1 time | Slight | 18% |
| NOx adsorption catalyst 25 | 45.0 g/l | 1.24 times | Slight | 15% |
| NOx adsorption catalyst 26 | 45.0 g/l | 1.46 times | Slight | 19% |
| NOx adsorption catalyst 27 | 45.0 g/l | 1.24 times | None | 4% |
| | 40.7 g/l | 1 time | | |
| NOx adsorption catalyst 28 | 45.0 g/l | 1.24 times | None | 5% |
| | 45.0 g/l | 1.46 times | | |
| NOx adsorption catalyst 29 | 5.00 g/l | 0.14 time | None | 14% |
| | 40.7 g/l | 1 time | | |
| NOx adsorption catalyst 30 | 5.00 g/l | 0.14 time | None | 8% |
| | 45.0 g/l | 1.46 times | | |
| NOx adsorption catalyst 31 | 0.100 g/l | 0.0028 time | Much | 53% |
| NOx adsorption catalyst 32 | 0.100 g/l | 0.0033 time | Much | 59% |
| NOx adsorption catalyst 33 (comparison) | 0 g/l | — | Very much | 75% |
| NOx adsorption catalyst 34 (comparison) | 0 g/l | — | Very much | 79% |
| NOx adsorption catalyst 35 (comparison) | 0 g/l | — | Very much | 80% |
| NOx adsorption catalyst 36 (comparison) | 0 g/l | — | Much | 58% |
| Carrier only (reference) | 0 g/l | — | None | 2% |

Notes for Table 2
*1Calculated from the difference in weights after and before firing. Therefore, presumed to basically be the weight of oxide of anchor substance. Some anchor substances have a form of a plurality of oxides, but each anchor substance is presumed to be represented by $P_2O_5$, $SiO_2$, $TiO_2$ or $Cr_2O_3$.
*2Decrease (%) in strength after durability test relative to initial strength As shown in Table 1 and Table 2, each of the NOx adsorption catalysts 1 to 32 based on the present invention, as compared with the comparative NOx adsorption catalysts 33 to 36 containing no anchor substance, was little in crack generation in carrier and low in strength decrease.

As described above, the catalyst body of the present invention contains a substance which reacts with the alkali metal and/or alkaline earth metal used as a catalyst component, in precedence over its reaction with the main component of the carrier used; therefore, even when the catalyst is subjected to a high temperature, the substance reacts with the alkali metal and/or alkaline earth metal and its reaction with the carrier is suppressed. As a result, with the present catalyst, the deterioration of the carrier by the alkali metal and/or alkaline earth metal is suppressed, and the catalyst can be used over a long period.

What is claimed is:

1. A catalyst body comprising
   (1) a honeycomb carrier having at least one main component;
   (2) a catalyst layer comprising
      (a) an alkali metal,
      (b) a heat-resistant inorganic oxide, and
      (c) a noble metal loaded on the heat-resistant inorganic oxide, and
   (3) an anchor substance present by being added separately as an anchor substance in the catalyst layer that reacts predominantly with said alkali metal when compared with main components of the honeycomb carrier and which is at least one member selected from the group consisting of B, Si, P, S, Cl, V, Cr, Mn, Ga, Ge, As, Se, Br, Zr, Mo, Sn, Sb, I and W, whereby any reaction between main components of the carrier and said alkali metal is suppressed and the deterioration of the carrier is suppressed.

2. A catalyst body according to claim 1, wherein at least one member of the noble metal loaded on the heat-resistant inorganic oxide is selected from the group consisting of Pt, Pd and Rh.

3. A catalyst body according to claim 1, wherein the main component of the carrier is cordierite.

4. A catalyst body comprising
   (1) a honeycomb carrier having at least one main component;
   (2) a catalyst layer comprising
      (a) an alkali metal,
      (b) a heat-resistant inorganic oxide, and
      (c) a noble metal loaded on the heat-resistant inorganic oxide, and
   (3) an anchor substance present by being added separately as an anchor substance in the carrier that reacts predominantly with said alkali metal when compared with main components of the honeycomb carrier and which is at least one member selected from the group consisting of B, P, S, Cl, V, Cr, Mn, Ga, Ge, As, Se, Br, Mo, Sn, Sb, I and W, whereby any reaction between main components of the carrier and said alkali metal is suppressed and the deterioration of the carrier is suppressed.

5. A catalyst body according to claim 4, wherein at least one member of the noble metal loaded on the heat-resistant inorganic oxide is selected from the group consisting of Pt, Pd and Rh.

6. A catalyst body according to claim 4, wherein the main component of the carrier is cordierite.

7. A catalyst body comprising
   (1) a honeycomb carrier having at least one main component;
   (2) a catalyst layer comprising
      (a) an alkali metal,
      (b) a heat-resistant inorganic oxide, and
      (c) a noble metal loaded on the heat-resistant inorganic oxide, and
   (3) an anchor substance present by being added separately as an anchor substance between the carrier and the catalyst layer that reacts predominantly with said alkali metal when compared with main components of the honeycomb carrier and which is at least one member selected from the group consisting of B, Si, P, S, Cl, Ti, V, Cr, Mn, Ga, Ge, As, Se, Br, Mo, Sn, Sb, I and W, whereby any reaction between main components of the carrier and said alkali metal is suppressed and the deterioration of the carrier is suppressed.

8. A catalyst body according to claim 7, wherein at least one member of the noble metal loaded on the heat-resistant inorganic oxide is selected from the group consisting of Pt, Pd and Rh.

9. A catalyst body according to claim 7, wherein the main component of the carrier is cordierite.

* * * * *